United States Patent
Weisskopf et al.

(10) Patent No.: US 6,375,360 B1
(45) Date of Patent: Apr. 23, 2002

(54) BALL BEARING

(75) Inventors: Ulrike Weisskopf, Aürachtal; Rainer Lutz, Markt Erlbach, both of (DE)

(73) Assignee: INA, Walzlager Schaeffler oHG (DE)

( * ) Notice: Subject to any disclaimer, the term of this patent is extended or adjusted under 35 U.S.C. 154(b) by 36 days.

(21) Appl. No.: 09/692,376

(22) Filed: Oct. 19, 2000

(30) Foreign Application Priority Data

Oct. 29, 1999 (DE) .......................................... 199 52 119

(51) Int. Cl.$^7$ .......................... F16C 19/16; F16C 25/08; F16C 35/06
(52) U.S. Cl. ........................ 384/538; 384/517; 384/536
(58) Field of Search .............................. 384/490, 517, 384/535, 536, 538

(56) References Cited

U.S. PATENT DOCUMENTS

| | | | |
|---|---|---|---|
| 2,232,473 A | | 2/1941 | Pulleyblank |
| 4,181,380 A | | 1/1980 | Vinel et al. |
| 4,718,781 A | * | 1/1988 | Gerard .................... 384/536 |
| 6,158,896 A | * | 12/2000 | Zernickel et al. ........... 384/506 |
| 6,179,473 B1 | * | 1/2001 | Ponson et al. ............ 384/517 |

FOREIGN PATENT DOCUMENTS

| | | |
|---|---|---|
| DE | 1259148 | 1/1968 |
| DE | 7012862 | 4/1970 |
| DE | 3808556 | 9/1989 |
| DE | 3831769 | 3/1990 |
| DE | 22910681 | 10/1999 |
| FR | 0677671 | 10/1995 |
| WO | 9826189 | 6/1998 |

* cited by examiner

Primary Examiner—David A. Bucci
Assistant Examiner—William C Joyce
(74) Attorney, Agent, or Firm—Bierman, Muserlian and Lucas

(57) ABSTRACT

An angular contact ball bearing of a steering shaft (27) of an automotive vehicle, said bearing comprising an inner bearing ring (11), an outer bearing ring (1) and bearing balls (7) arranged between the inner and outer bearing rings in rolling contact with raceways (14, 5) formed on the inner and outer bearing rings, the inner bearing ring (11) being received by an elastic tolerance ring (15) of a polymeric material, said bearing further comprising an inseparable assembly, wherein, a retaining ring (20) is arranged between the steering shaft (27) and the tolerance ring (15), the retaining ring (20) comprises circumferentially equi-spaced retaining elements (19) that project therefrom in axial direction and comprise radially outward directed retaining lugs (22) that overlap the outer bearing ring (1), the tolerance ring (15) comprises circumferentially equi-spaced clearances (18) for receiving the retaining elements (19), and the tolerance ring (15) extends in axial direction up to the end of a generally radially extending portion (12) of the inner bearing ring (11).

8 Claims, 2 Drawing Sheets

BALL BEARING

FIELD OF THE INVENTION

The present invention relates to an angular contact ball bearing, and in particular to an angular contact ball bearing of a steering shaft of an automotive vehicle, said bearing comprising an inner bearing ring, an outer bearing ring and bearing balls arranged between the inner and outer bearing rings in rolling contact with raceways formed on the inner and outer bearing rings, the inner bearing ring being received by an elastic tolerance ring of a polymeric material, said bearing further comprising a means for forming an inseparable assembly.

BACKGROUND OF THE INVENTION

Angular contact ball bearings of the pre-cited type, which are generally made by shaping without chip removal, support axial forces only in one direction and therefore have to be placed against a second bearing. These bearings are preferentially used as steering bearings because they have only a small moment of friction and a relatively high rigidity while being simple and economic to mount.

One such angular contact ball bearing of the pre-cited type as frequently used for the mounting of steering shafts is known from DE 38 08 556 A1. The inner ring of this bearing is received by a plastic tolerance ring which engages around the inner and outer rings by a radial projection. At the other axial end of the inner ring, there is arranged a spring element in the form of a spring washer that is retained in the tolerance ring by a locking washer that is likewise secured in the tolerance ring by a radially inward directed projection. In this way, a pre-stressed assembly is formed out of the rolling bearing and the retaining and tensioning elements. Thus, a pre-assembled component is obtained that has only to be slipped-on in axial direction during mounting.

A drawback of the above construction is that, as viewed in axial direction, the tolerance ring extends over the entire length of the raceways of the bearing balls. This increases the overall radial dimension of the bearing because such a tolerance ring is made by injection and therefore must have a cross-section of >1 mm in its thinnest region.

OBJECTS OF THE INVENTION

It is an object of the invention to provide a steering bearing which eliminates the drawbacks of the prior art.

This and other objects and advantages of the invention will become obvious from the following detailed description.

SUMMARY OF THE INVENTION

The invention achieves the above objects by the fact that a retaining ring is arranged between the steering shaft and the tolerance ring, the retaining ring comprises circumferentially equi-spaced retaining elements that project therefrom in axial direction and comprise radially outward directed retaining lugs that overlap the outer bearing ring, the tolerance ring comprises circumferentially equi-spaced clearances for receiving the retaining elements, and the tolerance ring extends in axial direction up to the end of a generally radially extending portion of the inner bearing ring.

Due to the fact that the tolerance ring does not extend over the entire axial length of the bearing and further, that it comprises clearances for receiving the retaining elements, the bearing assembly of the invention has only a small overall radial dimension. The radial distance between the steering shaft and the inner bearing ring of the steering bearing is no longer determined, as it was hitherto, by the radial dimension of the tolerance ring in the raceway region but by the radial thickness of the retaining elements, but these can be made very thin, viz., in the region of some tenths of a millimeter. The retaining elements that overlap the outer bearing ring may have a resilient configuration, or they may be bent over outwards when mounting is completed. In both cases, the retaining lugs are instrumental in forming an inseparable assembly.

According to a further advantageous feature of the invention, the retaining ring comprises on an end opposing the retaining elements, at least one radially outward directed projection that engages into an associated recess in the tolerance ring. This radially outward directed projection serves as a mounting aid and thus facilitates the mounting of the bearing as a whole.

If such a bearing is used as an upper steering bearing in a longitudinal column, a means for transmitting electric current from the steering shaft through the rolling bearing to the steering tube must be provided. This is required for operating the signal horn or for releasing the airbag. Therefore, according to another feature of the invention, the conducting connection between the steering shaft and the steering tube is established through the retaining ring which, in accordance with the invention, is made of a material with good electric conductivity, for example copper or a copper alloy. In this case, it is particularly advantageous if the retaining elements comprise tabs pointing in both circumferential directions. If necessary, these tabs can then be folded over radially inwards so that a connection with good conducting properties is established between the retaining ring and the steering shaft.

According to another feature of the invention, the conducting connection between the steering shaft and the steering tube can be obtained by making the tolerance ring of a polymeric material that can conduct electric current. In this case, the electric conductivity of the polymer must be raised to match that of a metal. This can be achieved, for example, by adding carbon or steel fibers or soot particles to the polymeric material. This has the advantage that the conductivity of the polymeric material already exists during the fabrication process so that an after-treatment of the finished plastic component is not required. The conductivity of the polymeric material can, however, also be established by a metallic coating that may be deposited by galvanic, chemical or PVD methods. Galvanic methods require a conducting layer to be deposited on the plastic after this has been cleaned and roughened. With the galvanic technology it is basically possible to provide components of almost any shape with dense, pore-free and strongly adhering metal coatings. Deposition is effected in a known manner from watery solutions that contain the metal to be deposited in the form of ions. By an application of electric tension, the metal ions are transported to the surface of the component where they are reduced and settle down on the surface under adhesion. In chemical or currentless metallizing, as known, metal ions are precipitated from a salt solution by reducing agents. The metallic precipitate thus formed settles down on the plastic component. The metal layers deposited by direct, currentless metallizing are, however, generally very thin, their normal layer thicknesses lying in the range of 1 to 5 $\mu$m. By PVD methods, a person skilled in the art understands coating methods based on the principle of "Physical Vapor Deposition" i.e., the coatings are produced by the precipitation of atoms or molecules out of the gaseous phase. The thickness of these coating layers can range from some tenths of a μm to some mm. PVD methods include vacuum metallizing, sputtering and ion plating.

According to still another feature of the invention, the angular contact ball bearing is biased in axial direction by an ondular washer which comprises circumferentially equi-spaced axial projections that engage into corresponding recesses of the tolerance ring. The ondular washer is thus connected in a detachable manner to the bearing assembly.

Finally, according to a last feature of the invention, the generally axially extending portion of the raceway of the outer bearing ring is followed by a step in the raceway which continues into an axial region of larger diameter that extends in axial direction up to the tolerance ring and ends in a radially outward directed flange. This division of the outer bearing ring by the step into two parts has a double advantage.

Firstly, when the bearing outer ring is fabricated by drawing, the tool for making the outer bearing ring can be matched separately to the shape of the raceway of the bearing balls and to the axially extending portion of the outer bearing ring. This has the positive effect on the bearing that any desired osculation can be achieved without regard to the axially extending region, i.e. independently of the outer diameter. Secondly, there is no negative effect on the raceway of the bearing balls when the angular contact ball bearing is pressed into the stationary steering tube with large tolerances because pressing-in is effected only with the axially extending portion of larger diameter. This assures a high basic load rating of the angular contact ball bearing.

The invention will now be described more closely with reference to the example of embodiment illustrated in the appended drawings.

DETAILED DESCRIPTION OF THE DRAWINGS

Figure 1:
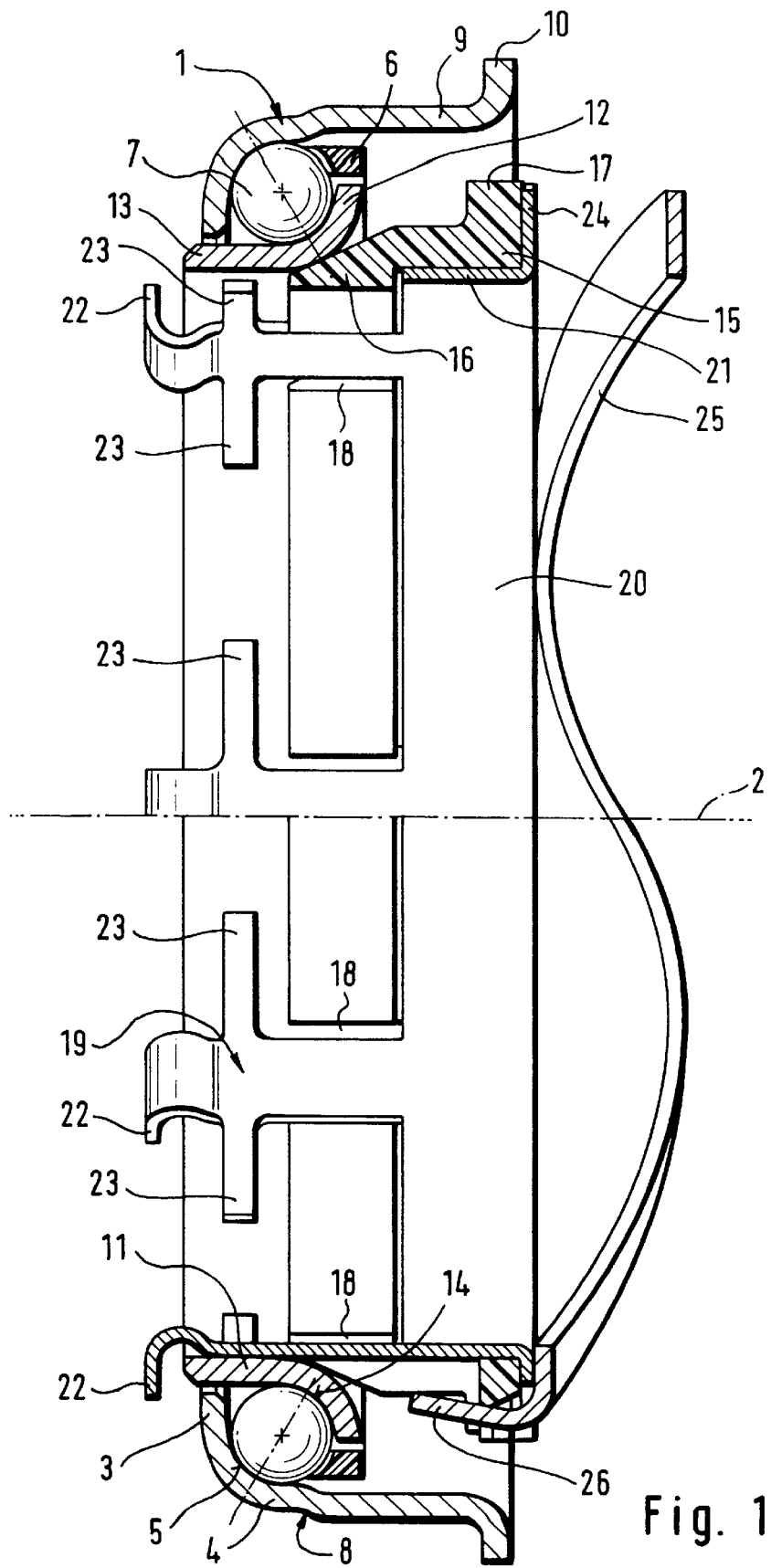
FIG. 1 is a longitudinal cross-section through an angular contact ball bearing of the invention.

The upper half of FIG. 1 shows a section of an angular contact ball bearing of the invention taken between two retaining elements 19, while the section shown in the lower half of FIG. 1 is taken through one retaining element 19. The angular contact ball bearing of the invention comprises a chiplessly drawn outer bearing ring 1 comprising a portion 3 that extends generally radially with respect to the axis of rotation 2 of the bearing and merges into a portion 4 that extends generally parallel to the axis of rotation 2. The two portions 3 and 4 form the outer raceway 5 for the bearing balls 7 that are guided in the cage 6. On the right end of its axially extending portion 4, the outer bearing ring 1 comprises a step 8 which is prolonged by a region 9 that extends parallel to the axis of rotation 2 and whose diameter is larger than the diameter of the step 8. At its right end, the region 9 merges into a radially outward directed flange 10. The inner bearing ring 11 is likewise made without chip removal and comprises a generally radially extending portion 12 and a generally axially extending portion 13, so that the inner raceway 14 for the bearing balls 7 is formed by these two portions 12 and 13 that merge into each other.

The inner bearing ring 11 is received by the polymer tolerance ring 15 that comprises an axially extending portion 16 and a radially extending flange 17. The portion 16 of the tolerance ring 15 extends up to the end of the generally radially extending portion 12 of the inner bearing ring 11 i. e., up to the left end of the inner raceway 14, or, to put it differently, up to a point just short of a line joining the centers of the upper and lower bearing balls 7. Over a part of its axial length, the tolerance ring 15 comprises radially extending through-apertures 18 into which the retaining elements 19 of the retaining ring 20 engage. The retaining ring 20 is very thin-walled and engages the tolerance ring 15 with its peripherally continuous portion 21. The circumferentially equi-spaced retaining elements 19 project from this portion 21 and comprise on their free ends radially outward directed retaining lugs 22 which overlap the outer bearing ring 1 thus leading to the formation of an inseparable assembly. The retaining elements 19 further comprise tabs 23 projecting therefrom in both peripheral directions and which can be bent over inwards, if necessary, to improve electrical contact. Further, at its right end, the retaining ring 20 comprises a radially outward extending projection 24 which engages into an associated recess of the tolerance ring 15 and serves as a mounting aid. At its end opposite the retaining elements 19, the tolerance ring 15 is equipped with an ondular washer 25 which comprises axially directed projections 26 that engage into associated recesses of the tolerance ring 15.

Figure 2:
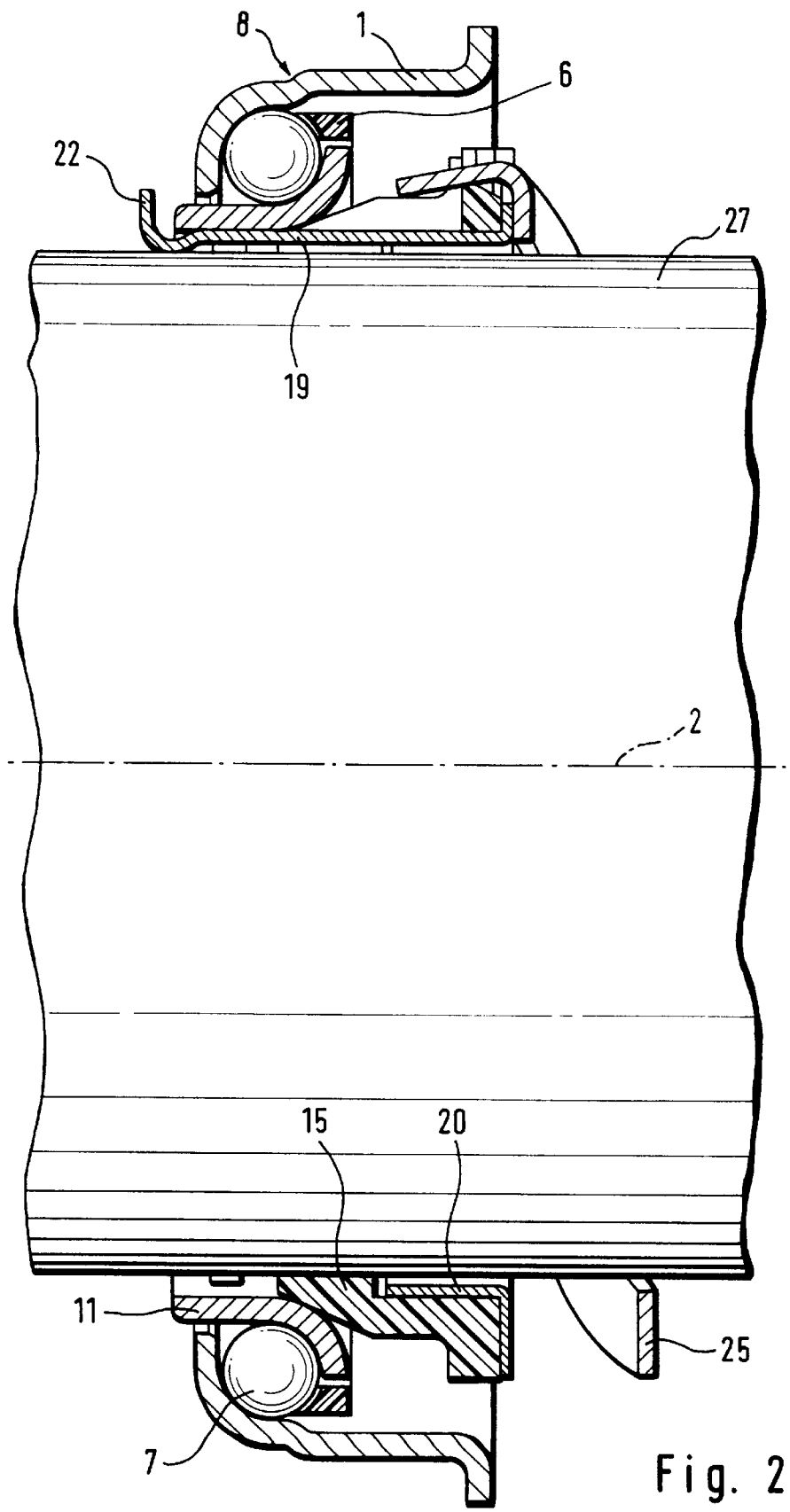
FIG. 2 is a longitudinal cross-section through the angular contact ball bearing of the invention with a steering shaft inserted therein.

FIG. 2 shows the bearing of the invention with its associated steering shaft 27. As can be seen in the lower part of this figure, this shaft 27 is retained in peripheral direction by the tolerance ring 15. The upper part of FIG. 2 shows that contact for conducting electric current is established by the retaining elements 19 that are in contact both with the steering shaft 27 and the inner bearing ring 11. Conduction of current takes place from the inside to the outside i.e., from the steering shaft 27, through the retaining elements 19 to the inner bearing ring 11, and from there, through the bearing balls 7 and the outer bearing ring 1 to the stationary steering tube, not shown. However, current may also be conducted through the tolerance ring 15 if this is configured with electric conductivity.

What is claimed is:

1. An angular contact ball bearing of a steering shaft of an automotive vehicle, said bearing comprising an inner bearing ring, an outer bearing ring and bearing balls arranged between the inner and outer bearing rings in rolling contact with raceways formed on the inner and outer bearing rings, the inner bearing ring being received by an elastic tolerance ring of a polymeric material, said bearing further comprising a means for forming an inseparable assembly, wherein a retaining ring is arranged between the steering shaft and the tolerance ring, the retaining ring comprises circumferentially equi-spaced retaining elements that project therefrom in axial direction and comprise radially outward directed retaining lugs that overlap the outer bearing ring, the tolerance ring comprises circumferentially equi-spaced clearances for receiving the retaining elements, and the tolerance ring extends in axial direction up to an end of a generally radially extending portion of the inner bearing ring.

2. An angular contact ball bearing of claim 1 wherein the retaining ring comprises on an end opposing the retaining elements, at least one radially outward directed projection that engages into an associated recess in the tolerance ring.

3. An angular contact ball bearing of claim 1 wherein the retaining ring is made of an electric conductive material.

4. An angular contact ball bearing of claim 3 wherein the retaining ring is made of copper or of a copper alloy.

5. An angular contact ball bearing of claim 1 wherein the retaining elements comprise tabs pointing in opposite circumferential directions.

6. An angular contact ball bearing of claim 1 wherein the tolerance ring is made of a polymeric material that can conduct electric current.

7. An angular contact ball bearing of claim 1 that is biased in axial direction by an ondular washer which comprises circumferentially equi-spaced axial projections that engage into corresponding recesses of the tolerance ring.

8. An angular contact ball bearing of claim 1 wherein a generally axially extending portion of the raceway of the outer bearing ring merges into a step which continues into an axial region of enlarged diameter that extends in axial direction and ends in a radially outward directed flange.

* * * * *